(12) United States Patent
Men et al.

(10) Patent No.: US 7,972,094 B2
(45) Date of Patent: Jul. 5, 2011

(54) ROTARY CUTTING TOOL HAVING RELEASABLY MOUNTED SELF-CLAMPING CUTTING HEAD WITH LOCKING MEMBER

(75) Inventors: Daniel Men, Haifa (IL); Philip Shaheen, Tarshiha (IL)

(73) Assignee: Iscar, Ltd., Tefen (IL)

( * ) Notice: Subject to any disclaimer, the term of this patent is extended or adjusted under 35 U.S.C. 154(b) by 812 days.

(21) Appl. No.: 12/016,473

(22) Filed: Jan. 18, 2008

(65) Prior Publication Data
US 2008/0193237 A1  Aug. 14, 2008

(30) Foreign Application Priority Data
Feb. 12, 2007 (IL) .......................... 181296

(51) Int. Cl.
*B23B 51/02* (2006.01)
(52) U.S. Cl. ......... 408/231; 408/226; 408/233; 408/713
(58) Field of Classification Search .................. 408/226, 408/227, 230, 231–233, 713; *B23B 51/00, B23B 51/02*
See application file for complete search history.

(56) References Cited

U.S. PATENT DOCUMENTS

| | | | | |
|---|---|---|---|---|
| 756,339 | A | * | 4/1904 | Down ........................... 408/233 |
| 1,499,584 | A | | 7/1924 | Litchfield |
| 3,304,816 | A | * | 2/1967 | Galorneau ................... 408/226 |
| 5,957,631 | A | | 9/1999 | Hecht |
| 6,059,492 | A | | 5/2000 | Hecht |
| 6,109,841 | A | | 8/2000 | Johne |
| 6,276,879 | B1 | | 8/2001 | Hecht |
| 6,485,235 | B1 | | 11/2002 | Mast et al. |
| 6,582,164 | B1 | | 6/2003 | McCormick |
| 6,899,495 | B2 | | 5/2005 | Hansson et al. |
| 7,048,480 | B2 | | 5/2006 | Borschert et al. |
| 7,070,367 | B2 | | 7/2006 | Krenzer |
| 7,101,125 | B2 | | 9/2006 | Borschert et al. |
| 2005/0260046 | A1 | | 11/2005 | Hecht et al. |

(Continued)

FOREIGN PATENT DOCUMENTS
JP           01097512 A    *    4/1989
(Continued)

OTHER PUBLICATIONS
International Search Report mailed on May 29, 2008 in PCT/IL2008/000120.

*Primary Examiner* — Daniel W Howell
(74) *Attorney, Agent, or Firm* — Womble Carlyle

(57) ABSTRACT

A rotary cutting tool having a longitudinal axis defining forward and rearward directions and a direction of rotation, includes a cutting head releasably mounted to a front end of a tool shank. The cutting head includes a cap portion and a rearwardly extending tail portion. The cap portion is provided with a plurality of head segments, each head segment having a rotationally leading end facing the direction of rotation and a rotationally trailing end. The trailing end of each head segment is provided with a locking member which extends in a direction opposite the direction of rotation. The tool shank has a forward end provided with a corresponding plurality of locking recesses opening out to the direction of rotation, and a shank pocket recess. In the assembled tool, the tail portion of the cutting head is received into the shank pocket recess and each of the plurality of locking members is received into a corresponding locking recess.

13 Claims, 16 Drawing Sheets

U.S. PATENT DOCUMENTS

2009/0311060 A1* 12/2009 Frejd .............................. 408/200
2010/0143059 A1* 6/2010 Hecht ............................ 408/200

FOREIGN PATENT DOCUMENTS

| JP | 2005169542 A | * | 6/2005 |
| JP | 2006231434 A | * | 9/2006 |
| WO | WO 8403241 A1 | * | 8/1984 |
| WO | WO 02/090027 | | 11/2002 |
| WO | WO 03/028930 | | 4/2003 |
| WO | WO 03/070408 | | 8/2003 |

* cited by examiner

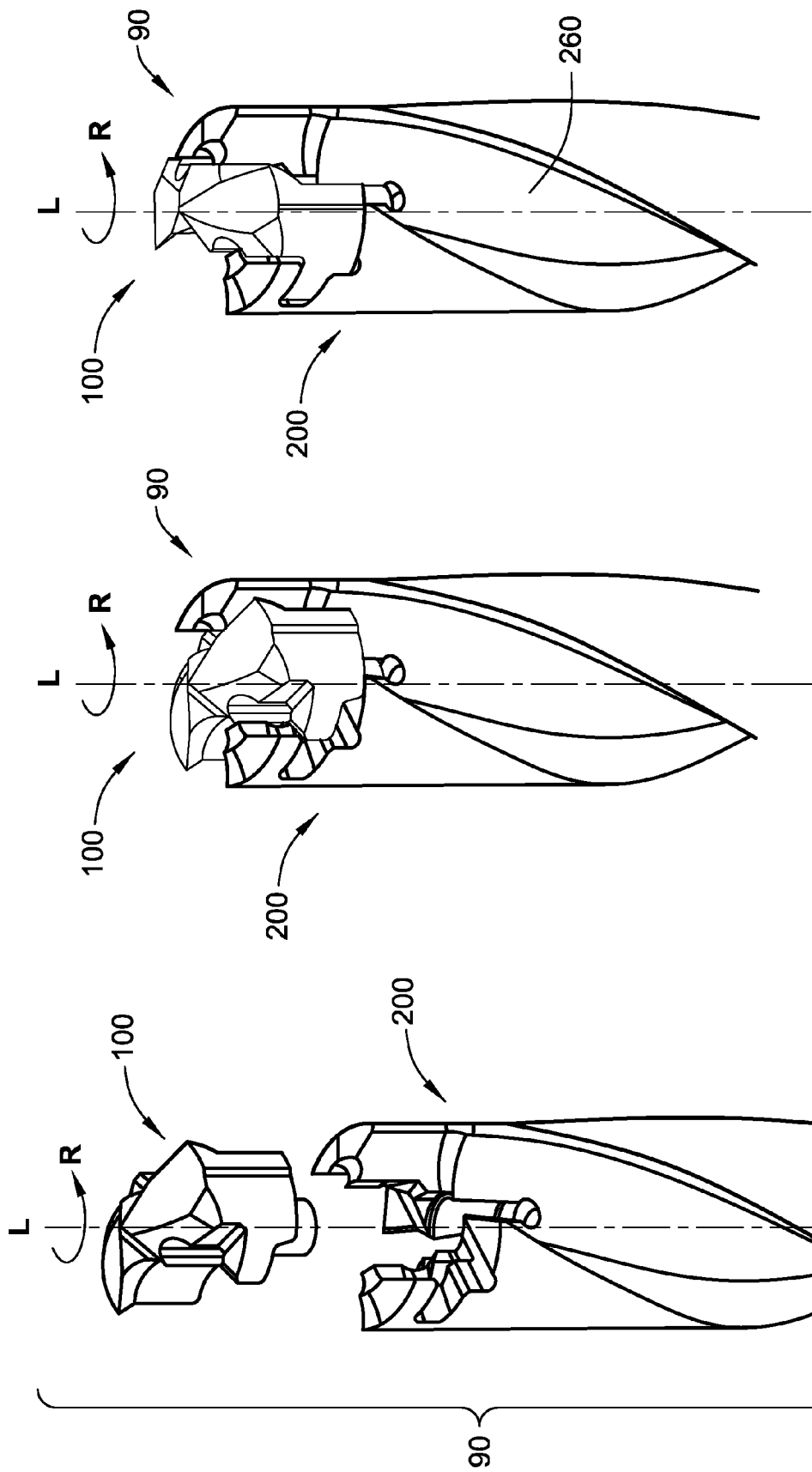

ROTARY CUTTING TOOL HAVING RELEASABLY MOUNTED SELF-CLAMPING CUTTING HEAD WITH LOCKING MEMBER

FIELD OF THE INVENTION

The current invention relates to a rotary cutting tool in general and, in particular, a drill having a releasably mounted cutting head.

BACKGROUND OF THE INVENTION

U.S. Published Patent Application No. 2005/0260046 A1 discloses a cutting tool comprising a cutting head having a cutting head longitudinal axis and tool shank having a shank longitudinal axis. The cutting head includes a cap portion and a tail (or "fixation") portion connected to the cap portion. The cap portion has a pair of head segments, each having a rearwardly facing head base surface, and the tail portion has one or more tail fixation surfaces. The tool shank, at a front end thereof, has a pair of resilient shank coupling portions separated by a pair of shank flutes. The forwardly facing front ends of each shank coupling portion is provided with a shank support surface configured to support a corresponding head base surface. Inner surfaces of the shank coupling portions are provided with one or more shank fixation surfaces shaped and configured to abut the tail fixation surfaces of the cutting head. When the tool is assembled, the shank support surface supports the head base surface and the one or more tail fixation surfaces abut the one or more shank fixation surfaces.

SUMMARY OF THE INVENTION

In one aspect, the present invention is directed to a cutting head of the sort used for drilling. The cutting head includes a cutting head longitudinal axis defining forward and rearward directions, and comprises a cap portion and a tail portion joined to the cap portion and extending in a rearward direction of the cutting head as shown in co-pending Israeli application number IL 181295. The cap portion comprises a plurality of spaced-apart head segments, each head segment comprising a head top surface, head base surface, a rotationally leading portion connected to the head top surface, the rotationally leading portion including a cutting edge and generally facing a direction of rotation about the longitudinal axis, and a rotationally trailing portion connected to the head top surface, the rotationally trailing portion including a head step wall which is connected to a trailing portion of said head top surface and extends in a rearward direction of the cutting head. The inventive cutting head is characterized in that each head segment further comprises a locking member extending in a direction opposite to said direction of rotation, each locking member comprising a first wall connected to a lower portion of said head step wall and principally extending in a direction opposite to said direction of rotation, a second wall connected to a trailing end of said first wall and principally extending in a rearward direction of the cutting head, and a third wall connected to a lower portion of said second wall and principally extending in said direction of rotation.

The first wall and the head base surface may be substantially perpendicular to the longitudinal axis.

The tail portion may comprise a plurality of circumferentially spaced apart tail fixation surfaces, each tail fixation surface extending at least partially along the cutting head longitudinal axis.

The circumferentially spaced apart tail fixation surfaces may be formed on an upper surface of the tail portion, proximate the head base surface.

Each head segment may further comprise at least one head coolant channel opening out at a point between the rotationally leading portion and the rotationally trailing portion.

The third wall may be a portion of the head base surface.

The second wall may be configured as a circumferential abutment surface, while the third wall may be configured as an axial abutment surface.

The first wall may also be configured as an axial abutment surface.

Each head segment may further comprise a fourth wall connected to a rotationally leading portion of said third wall and principally extending in a rearward direction of the cutting head, and a fifth wall connected to a lower portion of the fourth wall and principally extending in the direction of rotation.

The first wall may be configured as an axial abutment surface; the fourth wall may be configured as a circumferential abutment surface; and the fifth wall may also configured as an axial abutment surface.

The fifth wall may be a portion of the head base surface.

The first wall and the fifth wall may be substantially parallel to one another.

In another aspect, the present invention is directed to a rotary cutting tool comprising the aforementioned cutting head releasably mounted on a forward end of a tool shank, the cutting head and the tool shank having a common longitudinal axis of rotation defining forward and rearward directions, and a direction of rotation around said longitudinal axis. The tool shank may have a shank longitudinal axis and comprise a shank pocket recess formed along the shank longitudinal axis and a plurality of rotationally spaced apart shank coupling portions formed at the forward end of the tool shank. Each shank coupling portion may comprise a shank locking recess having an opening facing the direction of rotation, the shank locking recess comprising an upper first surface extending along said direction of rotation, an intermediate second surface connected to the upper first surface and principally extending in a rearward direction of the tool shank, and a lower third surface connected to the intermediate second surface and principally extending along said direction of rotation. Each locking member of the cutting head then occupies a corresponding locking recess on the tool shank, and the tail portion of the cutting head occupies the shank pocket recess on the tool shank.

The tail portion may comprise a plurality of circumferentially spaced apart tail fixation surfaces, each tail fixation surface extending at least partially along the cutting head longitudinal axis; the shank pocket recess comprises a plurality of circumferentially spaced apart shank fixation surfaces; and each of a first plurality of shank fixation surfaces abut a corresponding one of a first plurality of tail fixation surfaces.

For each shank coupling portion, the intermediate second surface may abut the second wall of a corresponding locking member, and serve as a torque transmission surface.

For each shank coupling portion, the lower third surface of the locking recess may abut the third wall of a corresponding locking member, and provide axial support thereto.

For each shank coupling portion, the upper first surface of the locking recess may abut the first wall of a corresponding locking member.

The tail portion of the cutting head may be in non-retaining sliding relationship with the shank pocket recess.

Each head segment of the cutting head may further comprise: a fourth wall connected to a rotationally leading portion of said third wall and principally extending in a rearward direction of the cutting head; and a fifth wall connected to a lower portion of said fourth wall and principally extending in said direction of rotation. Furthermore, each shank coupling portion of the tool shank may further comprise: a fourth surface connected to the lower third surface, the fourth surface principally extending in a rearward direction of the tool shank; and a fifth surface connected to a lower portion of the fourth surface and principally extending in said direction of rotation. In such case, the first surface of each shank coupling portion may abut the first wall of a corresponding head segment; the fourth surface of each shank coupling portion may abut the fourth wall of a corresponding head segment; and the fifth surface of each shank coupling portion may abut the fifth wall of a corresponding head segment.

The first surface of each shank coupling portion may provide axial support to a corresponding head segment; the fourth surface of each shank coupling portion may serve as a torque transmission surface; and the fifth surface of each shank coupling portion may provide axial support to a corresponding head segment.

BRIEF DESCRIPTION OF THE DRAWINGS

For a better understanding of the present invention and to show how the same may be carried out in practice, reference will now be made to the accompanying drawings, in which:

FIG. 1 shows a perspective view of a disassembled cutting tool assembly in accordance with a first embodiment of the invention.

FIG. 2 shows a partially assembled cutting tool assembly in accordance with FIG. 1.

FIG. 3 shows a fully assembled cutting tool assembly in accordance with FIG. 1.

DETAILED DESCRIPTION OF PREFERRED EMBODIMENTS

Figure 4:
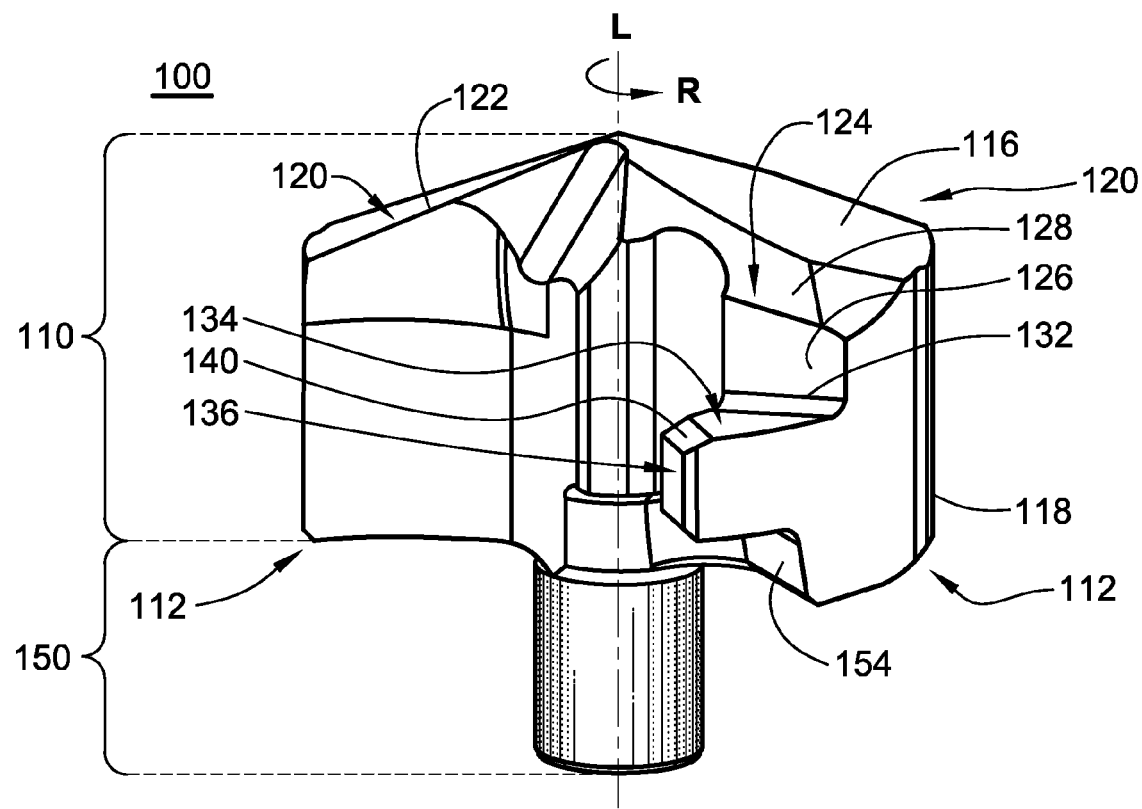
FIG. 4 shows a side perspective view of a cutting head in accordance with a first embodiment of the invention, as seen in FIG. 1.

The contents of aforementioned U.S. Published Patent Application No. 2005/0260046 A1 are incorporated by reference to the extent necessary to understand the present invention.

FIGS. 1-3 show a rotary metal cutting tool 90 in accordance with a first embodiment of the present invention. The rotary metal cutting tool shown here is a drill 90, though the principles of the present invention may apply to tools other than drills.

The drill 90 includes a cutting head 100 releasably mounted on a shank 200 with the cutting head 100 and the shank 200 having a common longitudinal tool axis L around which the tool rotates in a direction of rotation R. The cutting head 100 is preferably of the sort used in metal cutting operations and thus can be considered a metal cutting head. Thus, the cutting head 100 is typically made of hard wear resistant material such as cemented carbide, and the tool shank 200 is typically made of steel. The shank 200 is provided with one or more axially extending shank flutes 260, each of which is fed from a corresponding head flute.

In FIG. 1, the drill is disassembled with the cutting head 100 and the shank 200 separated from one another, though the two components are aligned along the longitudinal axis L in preparation for assembly. In FIG. 2, the drill is partially assembled with the cutting head 100 in abutment with the shank 200, the two components having simply been brought together along the longitudinal axis L from their relative positions in FIG. 1. Thus, in FIG. 2, the cutting head 100 and the shank 200 are at the same rotational orientation about the longitudinal axis L, as seen in FIG. 1. Finally, in FIG. 3, the cutting head 100 is rotated in a direction opposite the direction of rotation R, relative to the shank 200, thereby securing the cutting head to the shank.

Figure 5:
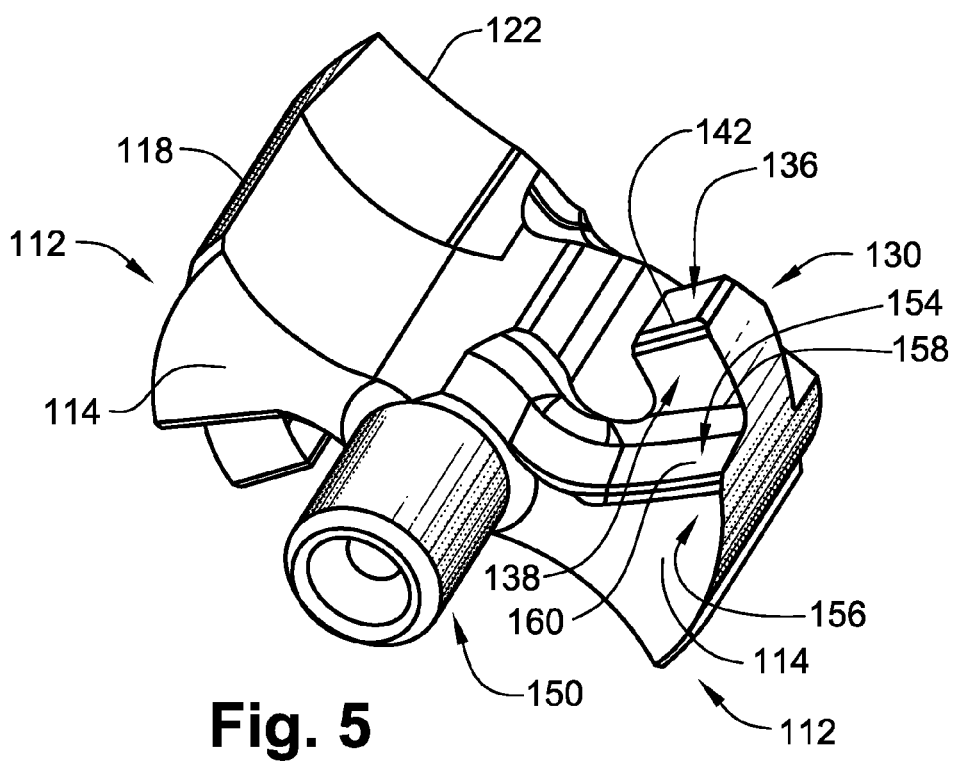
FIG. 5 shows a bottom perspective view of the same cutting head seen in FIG. 5.

FIGS. 4 and 5 show a side perspective view and a bottom perspective view, respectively, of the cutting head 100 seen in FIG. 1. The cutting head 100 comprises a cap portion 110 and a tail portion 150 joined to the cap portion 110. The tail portion 150 extends in a rearward direction of the cutting head 100.

The cap portion 110 includes a plurality of rotationally spaced-apart head segments 112. Although only two head segments are shown, it is understood that other numbers of head segments may be provided instead. Each head segment 112 comprises a head base surface 114, a head top surface 116 and a head peripheral surface 118.

Each head segment 112 also includes a rotationally leading portion 120 connected to the head top surface 116. The rotationally leading portion 120 includes a cutting edge 122 generally facing the direction of rotation R about the longitudinal axis L. Each head segment also includes a rotationally trailing portion 124 connected to the head top surface 116. The rotationally trailing portion 124 includes a head step wall 126 which is connected to a trailing portion 128 of the head top surface 116. The head step wall 126 extends in a rearward direction of the cutting head 100, i.e., towards the tail portion 150.

Each head segment 112 also includes a locking member 130 which is connected to a lower portion 132 of the head step wall 126, and extends in a direction opposite to the direction of rotation R. The locking member 130 includes a first wall 134, a second wall 136 and a third wall 138. The first wall 134 is connected to the lower portion of the head step wall 126 and principally extends therefrom in a direction opposite to the direction of rotation R. The first wall 134 and the head base surface 114 both are substantially perpendicular to the longitudinal axis of rotation L. The second wall 136 is connected to the first wall 134 optionally via a trailing end 140 of the first wall 134 and principally extends in a rearward direction of the cutting head 100. The third wall 138 is connected to a lower portion 142 of the second wall and circumferentially extends in the direction of rotation R, from the second wall 136.

In this first embodiment, seen in FIGS. 4 and 5, each head segment 112 also includes a fourth wall 154 and a fifth wall 156. The fourth wall 154 is connected to a rotationally leading portion 158 of the third wall 138 and principally extends in a rearward direction of the cutting head 100.

The fifth wall 156 is connected to the fourth wall 154 optionally via a lower portion 160 of the fourth wall 154 and principally extends in the direction of rotation. As best seen in FIG. 5, in this embodiment, the fifth wall 156 may form a portion of the head base surface 114. Furthermore, the first wall 134 and the fifth wall 156 may be substantially parallel to one another.

In one configuration of the cutting head 100, the first wall 134 is configured as an axial abutment surface, the fourth wall 154 is configured as a circumferential abutment surface, and the fifth wall 156 is configured as an axial abutment surface. Meanwhile in this configuration, the second wall 136 and the third wall 138 are not configured to serve as abutment surfaces.

Figure 6:
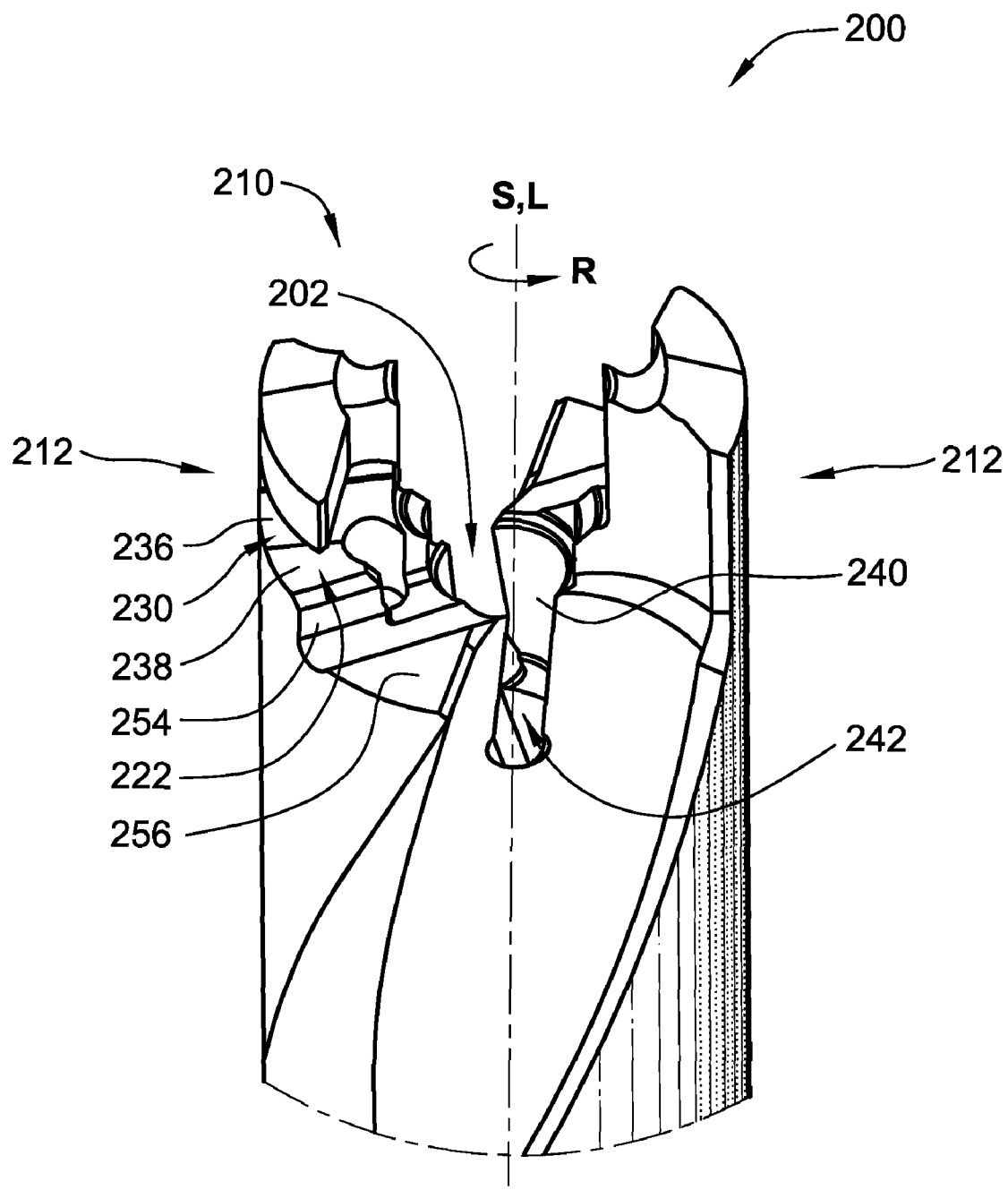
FIG. 6 shows a perspective view of a tool shank in accordance with a first embodiment of the invention, as seen in FIG. 1.

FIG. 6 shows a perspective view of the tool shank 200 seen in FIGS. 1-3. The tool shank 200 has a shank longitudinal axis S which is coincident with the longitudinal axis of rotation L of the assembled tool 90. The shank 200 also has a plurality of rotationally spaced apart shank coupling portions 212. Each shank coupling portion 212 comprises a shank locking recess 230 having a circumferential opening 222 facing the direction of rotation R. At its forward end 210, the shank 200 is provided with a shank pocket recess 202 having substantially cylindrical component side walls 240 extending along the shank longitudinal axis S. In the embodiment shown, slots 242 separate the component side walls 240.

Figure 7:
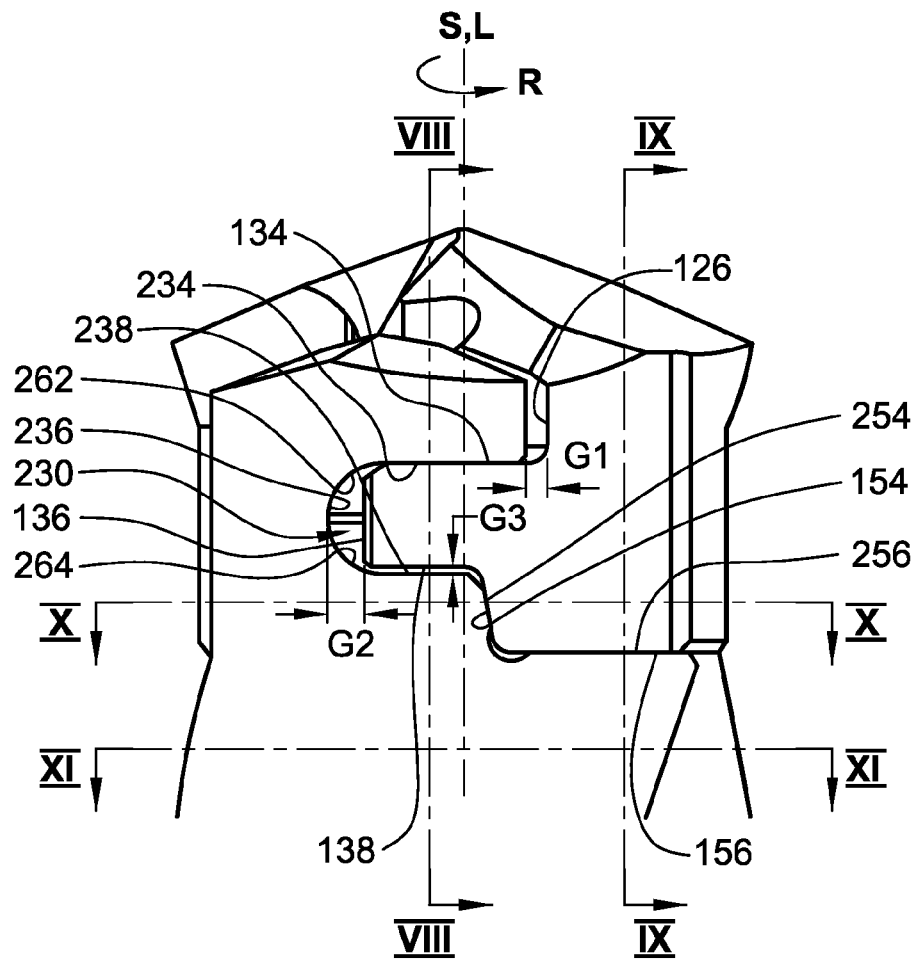
FIG. 7 shows a side view close up of the cutting tool assembly of FIG. 3 showing the locking member mated to the locking recess.

As best seen in FIG. 7, each shank locking recess 230 comprises an upper first surface 234 extending along the direction of rotation R, an intermediate second surface 236, and a lower third surface 238. The intermediate second surface 236 is connected to a trailing end 262 of the upper first surface 234, faces a substantially circumferential direction, and principally extends in a rearward direction of the tool shank 200. Meanwhile, the lower third surface 238 is connected to a lower portion 264 of the intermediate second surface 236 and principally extends along the direction of rotation R. The circumferential opening 222 is formed between the upper first surface 234 and the lower third surface 238.

In this first embodiment of the tool shank 200, each shank coupling portion 212 of the tool shank further comprises a fourth surface 254 and a fifth surface 256. The fourth surface 254 is connected to the lower third surface 238, faces along the direction of rotation R, and principally extends in a rearward direction of the tool shank 200. The fourth surface 254 serves as a torque transmission surface 254, which imparts a rotational force in the direction R to the cutting head 100. The fifth surface 256 is connected to a lower portion of the fourth surface 254 and principally extends in the direction of rotation R.

In the fully assembled tool, each locking member 130 of the cutting head 100 occupies a corresponding locking recess 230 on the tool shank 200, and the tail portion 150 of the cutting head 100 occupies the shank pocket recess 202 on the tool shank 200.

Figure 11:
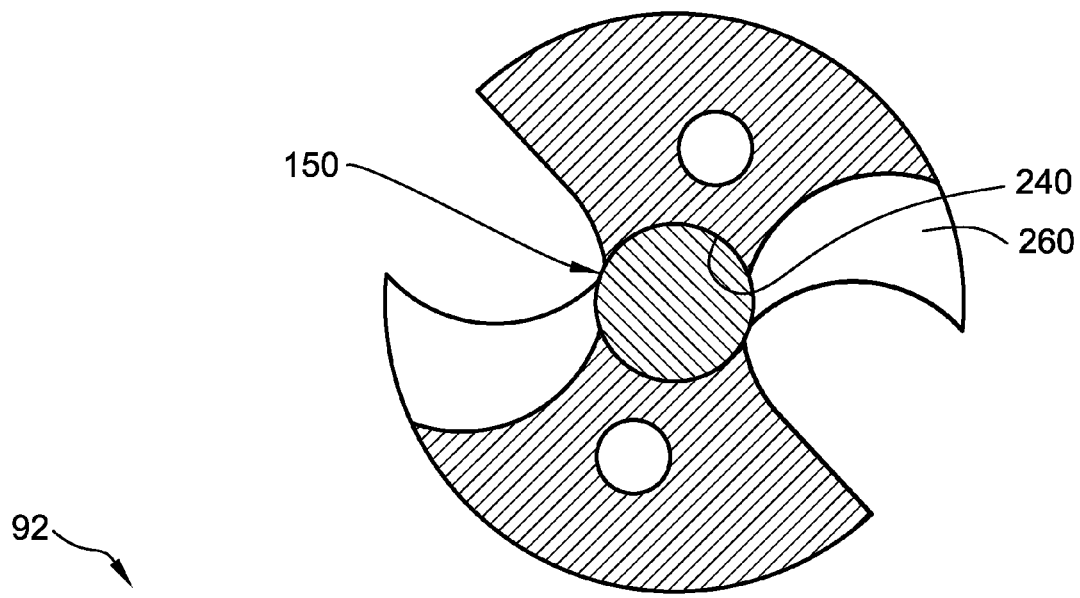
FIG. 11 shows a cross-section taken along lines XI-XI in FIG. 7.

In a preferred arrangement, the tail portion 150 of the cutting head 100 is in a non-retaining sliding relationship with the component side walls 240 of the shank pocket recess 202 (see FIG. 11). In other words, the component side walls 240 do not grasp the tail portion 150 so as to retard the latter's insertion or removal.

Figure 8:
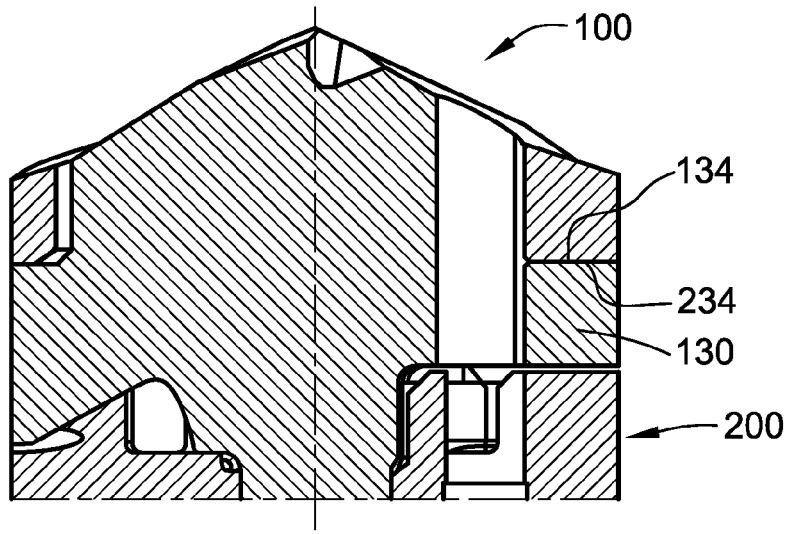
FIG. 8 shows a cross-section taken along lines VIII-VIII in FIG. 7.
Figure 9:
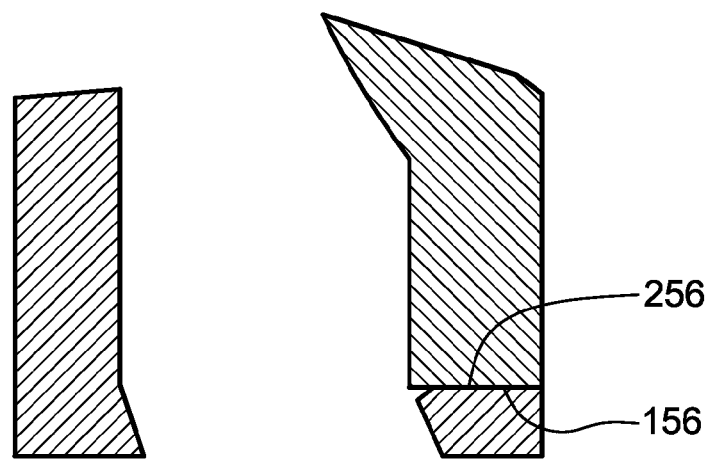
FIG. 9 shows a cross-section taken along lines IX-IX in FIG. 7.
Figure 10:
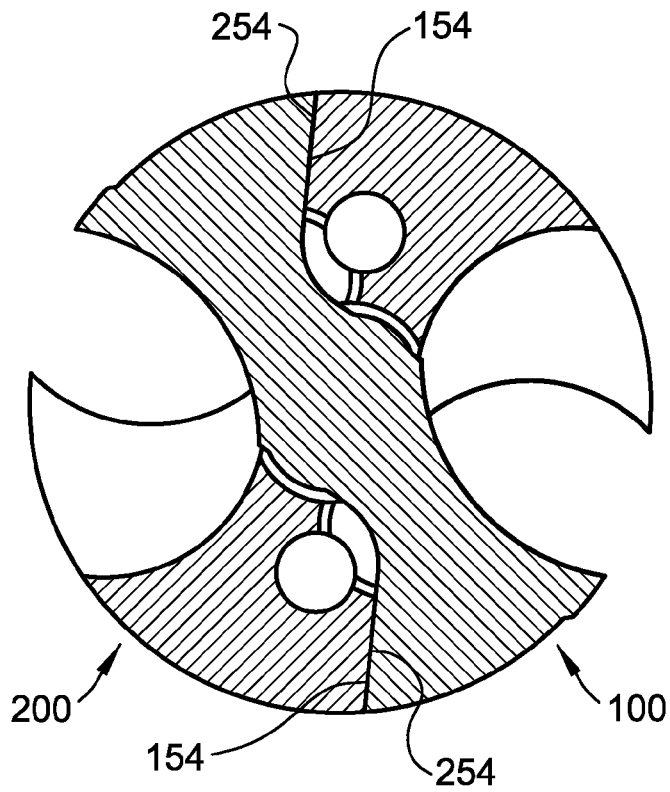
FIG. 10 shows a cross-section taken along lines X-X in FIG. 7.

In the fully assembled tool of the first embodiment, there are a plurality of peripheral points of abutment between a head segment 112 and a corresponding shank coupling portion 212. As seen in FIGS. 7 and 8, the first surface 234 of each shank coupling portion 210 abuts the first wall 134 of a corresponding head segment. As seen in FIG. 9, the fifth surface 256 of each shank coupling portion abuts the fifth wall 156 of a corresponding head segment. Finally, as seen in FIG. 10, the fourth surface 254 of each shank coupling portion abuts the fourth wall 154 of a corresponding head segment.

As best seen in FIG. 7, in one configuration, a first gap G1 is formed between the head step wall 126 and the shank coupling portion, a second gap G2 is formed between the locking member's second wall 136 and the intermediate second surface 236 of the locking recess 230, and a third gap G3 is formed between the locking member's third wall 138 and the lower third surface 238 of the locking recess 230. Thus, at least portions of the head step wall 126, the locking member's second wall 136 and the locking member's third wall 138 remain unabutted by the shank coupling portion.

In terms of functionality, the fourth surface 254 of each shank coupling portion serves as a torque transmission surface 254, abutting and imparting a rotational force to the cutting head 100 in the direction of rotation R. Furthermore, the first surface 234 of each shank coupling portion 210 provides axial support in a rearward direction to a corresponding head segment 112, while the fifth surface 256 of each shank coupling portion provides axial support in the forward direction to the head segment 112. Thus, in the axial direction, the locking member 130 abuts, and is wedged between, the first surface 234 and the fifth surface 256 the coupling portion. The first, fourth and fifth walls of each head segment 112 and the first, fourth and fifth walls of each surfaces of each shank coupling portion 212 may be ground to facilitate abutment.

Figure 12:
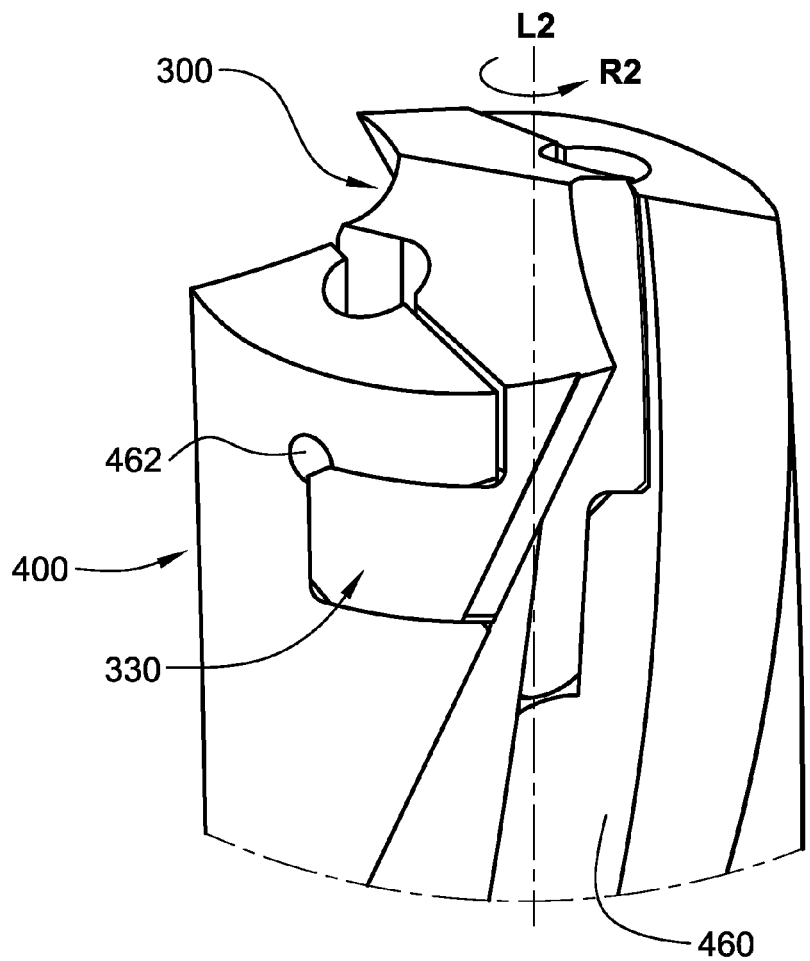
FIG. 12 shows a fully assembled cutting tool assembly in accordance with a second embodiment of the invention.

FIG. 12 shows a rotary metal cutting tool 92, in this case a drill 92, in accordance with a second embodiment of the present invention. The drill 92 includes a cutting head 300 releasably mounted on a shank 400 with the cutting head and the shank having a common longitudinal tool axis L2 around which the tool rotates in a direction of rotation R2. The cutting head 300 is preferably of the sort used in metal cutting operations and thus can be considered a metal cutting head. The cutting head 300 and tool shank 400 in drill 92 are made of the same corresponding materials discussed above with respect to drill 90. The shank 400 is provided with one or more axially extending shank flutes 460, each of which is fed from a corresponding head flute, in the assembled tool.

Figure 13:
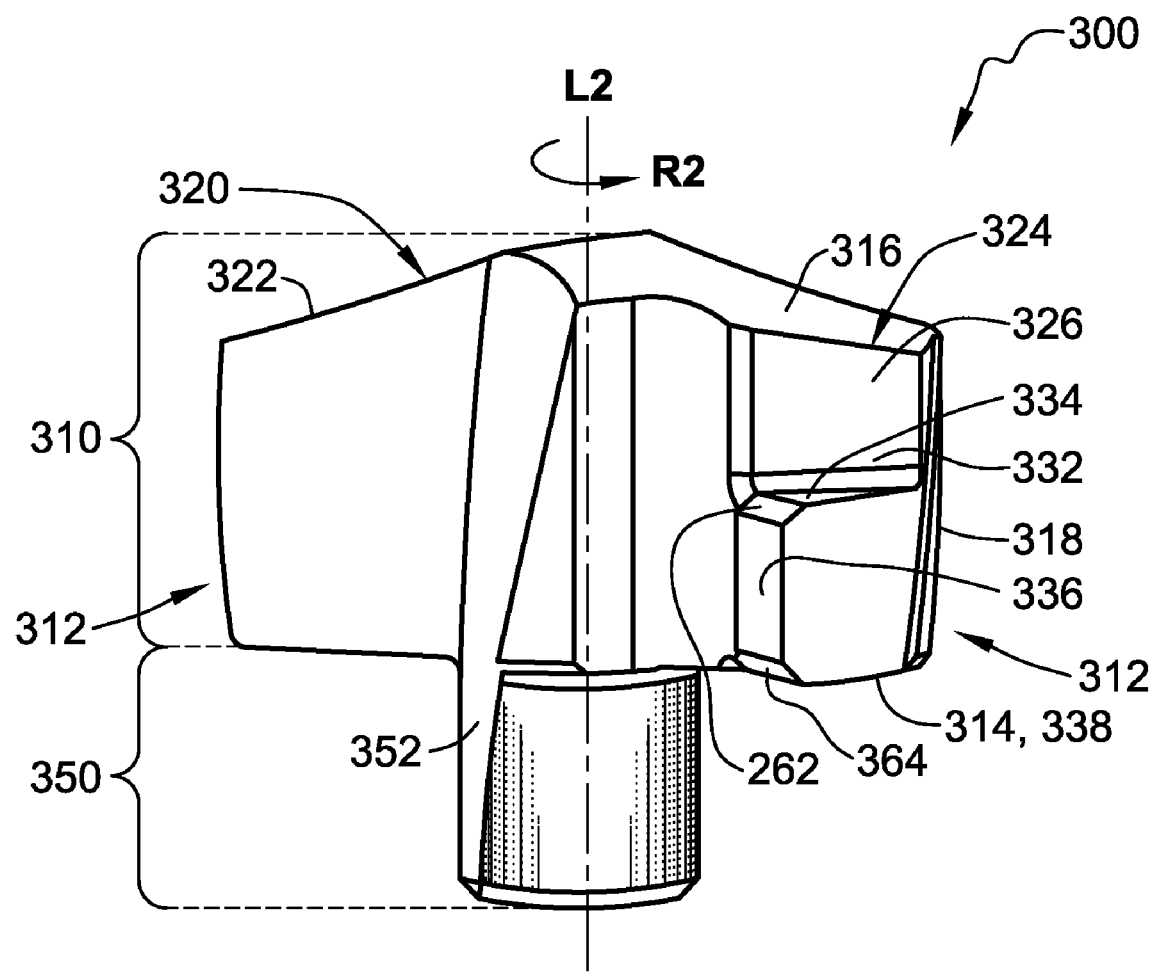
FIG. 13 shows a side view of a cutting head in accordance with a second embodiment of the invention, as seen in FIG. 12.

FIG. 13 shows a top perspective view of the cutting head 300 seen in FIG. 12. Cutting head 300 comprises a cap portion 310 and a tail portion 350 joined to the cap portion 310. The tail portion 350 extends in a rearward direction of the cutting head 300. The cap portion 310 includes a plurality of rotationally spaced-apart head segments 312. Although only two head segments 312 are shown, it is understood that other numbers of head segments 312 may be provided instead. Each head segment 312 comprises a head base surface 314, a head top surface 316 and a head peripheral surface 318. A head flute 352 connecting the cap portion 310 to the tail portion 350 is present between adjacent head segments 312.

Each head segment 312 also includes a rotationally leading portion 320 having a cutting edge 322 that generally faces the direction of rotation R2 about the longitudinal axis L2. Each head segment 312 also includes a rotationally trailing portion 324. The rotationally trailing portion 324 includes a head step wall 326 which is connected to a trailing portion of the head top surface 316. The head step wall 326 extends in a rearward direction of the cutting head 300, i.e., towards the tail portion 350.

Figure 15:
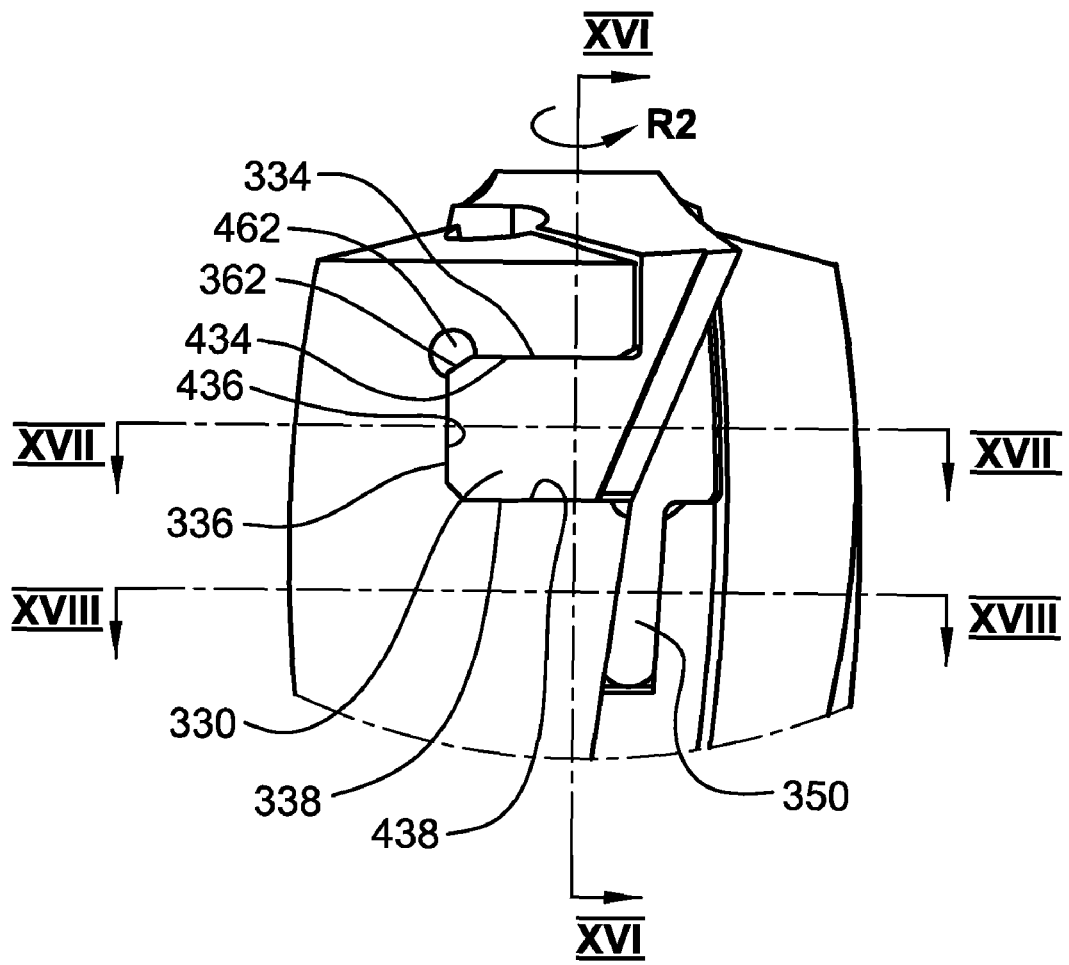
FIG. 15 shows a side view close up of the cutting tool assembly of FIG. 12 showing the locking member mated to the locking recess.

As seen in FIGS. 13 and 15, each head segment 312 also includes a locking member 330 which is connected to a lower portion 332 of the head step wall 326, and extends in a direction opposite to the direction of rotation R2. The locking member 330 includes a first wall 334, a second wall 336 and a third wall 338 which, in this second embodiment forms a portion of the head base surface 314. The first wall 334 is connected to a lower portion 332 of the head step wall 326 and principally extends in a direction opposite to the direction of rotation R2. The first wall 334 and the head base surface 314 both are substantially perpendicular to the longitudinal axis of rotation L2. The second wall 336 is connected to a trailing end of the first wall 334 optionally via a first relief wall 362, and principally extends in a rearward direction of the cutting head 300. The third wall 338 is connected to a lower portion of the second wall 336 optionally via a second relief wall 364 and circumferentially extends in the direction of rotation R2, from the second wall 336.

In this second embodiment of the cutting head 300, the second wall 336 is configured as a circumferential abutment surface, while the first wall 334 and third wall 338 are configured as axial abutment surfaces. As such, the first 334, second 336 and third 338 walls may be ground to facilitate seating and abutment.

Figure 14:
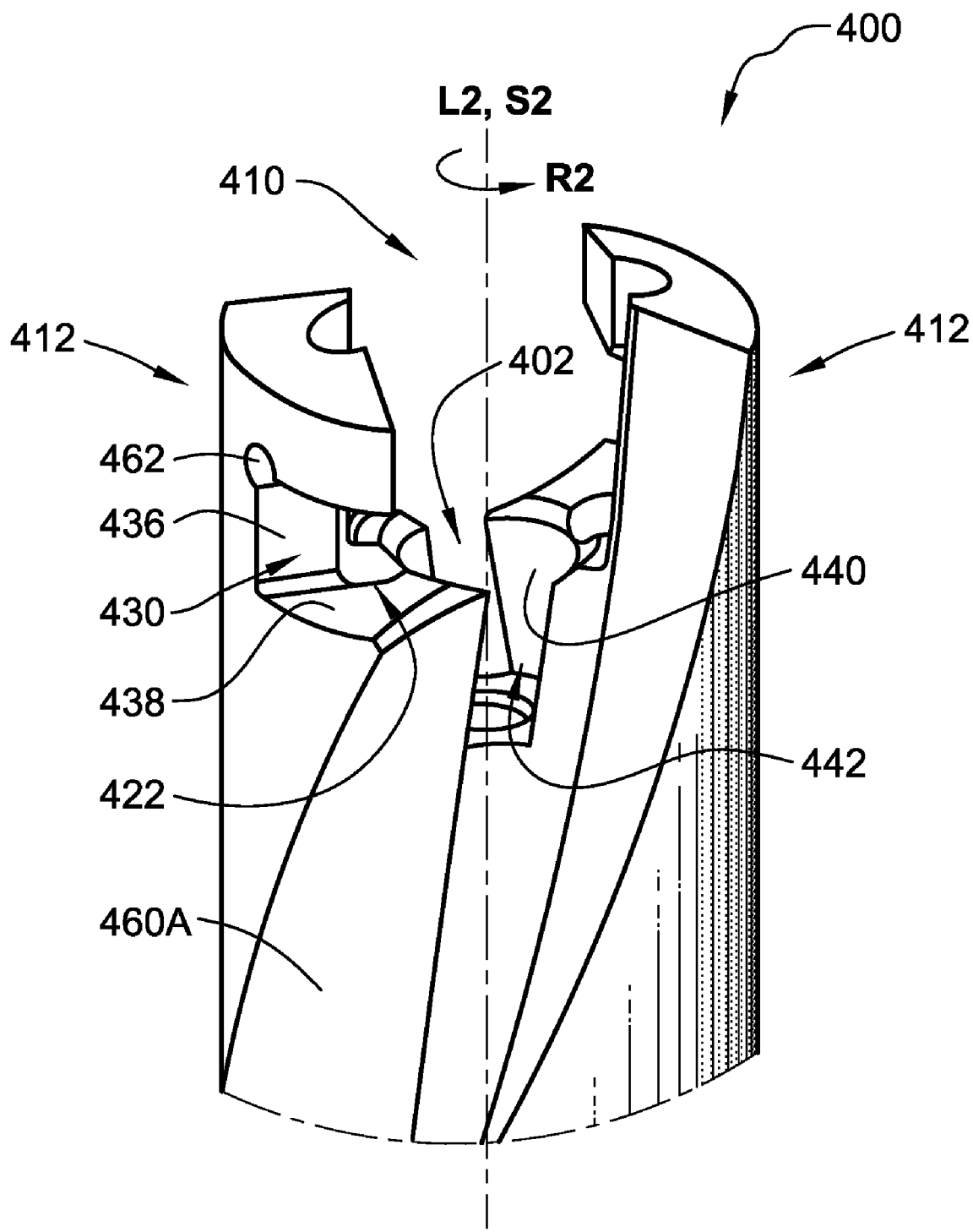
FIG. 14 shows a perspective view of a tool shank in accordance with a second embodiment of the invention, as seen in FIG. 12.

FIG. 14 shows a perspective view of the tool shank 400 seen in FIG. 12. The tool shank 400 has a shank longitudinal axis S2 which is coincident with the longitudinal axis of rotation L2 of the assembled tool 92. The shank 400 also has a plurality of rotationally spaced apart shank coupling portions 412. Each shank coupling portion 412 comprises a shank locking recess 430 having a circumferential opening 422 facing the direction of rotation R2. At its forward end 410, the shank 400 is provided with a shank pocket recess 402 having substantially cylindrical component side walls 440 extending along the shank longitudinal axis S2. In the embodiment shown, slots 442 separate the component side walls 440.

As best seen in FIGS. 14 and 15, each shank locking recess 430 comprises an upper first surface 434 extending along the direction of rotation R2, an intermediate second surface 436, and a lower third surface 438. The intermediate second surface 436 is connected to a trailing end of the upper first surface 434 optionally via a relief recess 462, faces a substantially circumferential direction and principally extends in a rearward direction of the tool shank 400. Meanwhile, the lower third surface 438 is connected to a lower portion of the intermediate second surface 436 and principally extends along the direction of rotation R2, from proximate the intermediate second surface 436 to the circumferential opening 422. The leading end of the third surface 438 terminates proximate the circumferential opening 422 and is adjacent a shank flute wall 460A.

Figure 18:
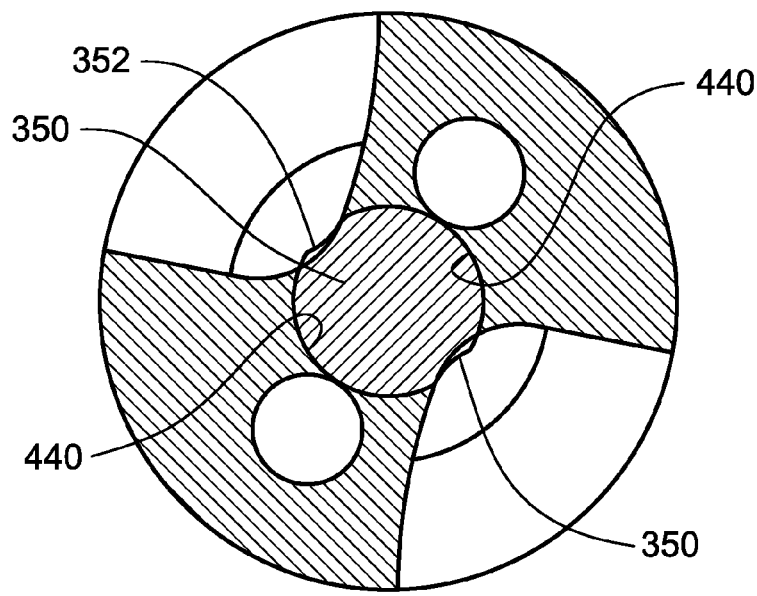
FIG. 18 shows a cross-section taken along lines XVIII-XVIII in FIG. 15.

In the fully assembled tool of the second embodiment, each locking member 330 of the cutting head 300 occupies the corresponding locking recess 430 on the tool shank 400, and the tail portion 350 of the cutting head 300 occupies the shank pocket recess 402 of the tool shank 400. In a preferred arrangement, the tail portion 350 of the cutting head 300 is in non-retaining sliding relationship with the component side walls 440 of the shank pocket recess 402 (see FIG. 18).

Figure 16:
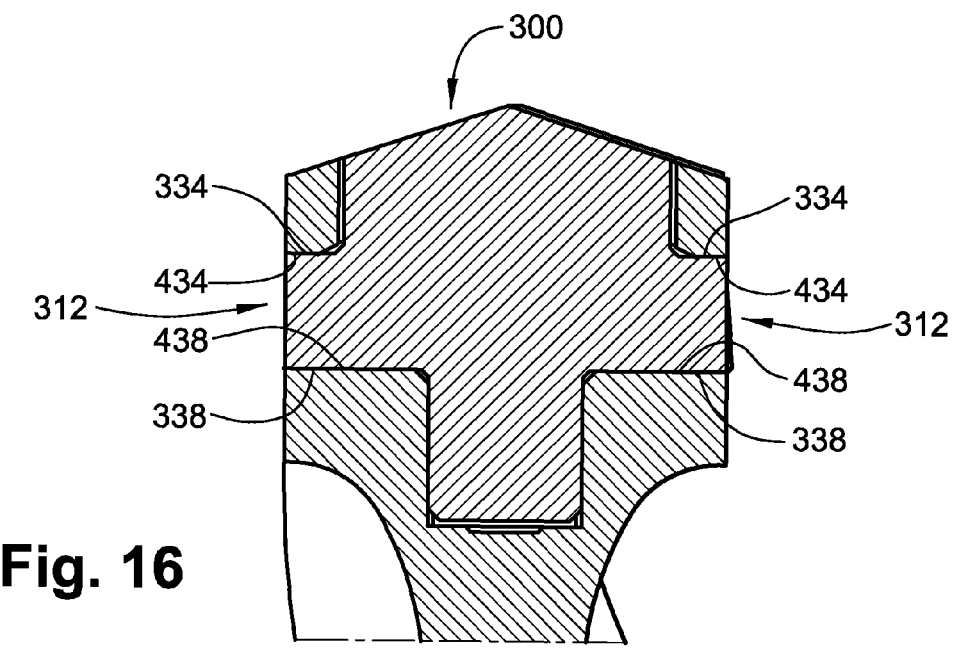
FIG. 16 shows a cross-section taken along lines XVI-XVI in FIG. 15.
Figure 17:
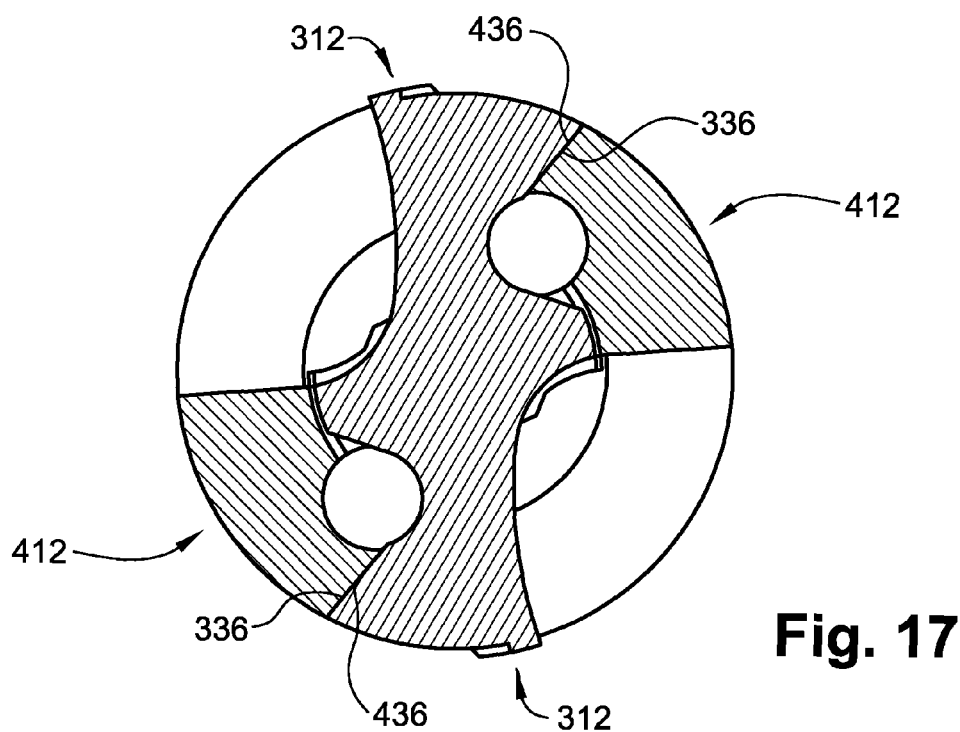
FIG. 17 shows a cross-section taken along lines XVII-XVII in FIG. 15.

In the fully assembled tool of the second embodiment, there are a plurality of peripheral points of abutment between a head segment 312 and a corresponding shank coupling portion 412. As seen in FIGS. 15 and 16, the first surface 434 of each shank coupling portion 412 abuts the first wall 334 of a corresponding head segment 312, and the third surface 438 of each shank coupling portion 412 abuts the third wall 338 of a corresponding head segment 312. As seen in FIGS. 15 and 17, the second surface 436 of each shank locking recess 430 abuts the second wall 336 of a corresponding head segment 312. Thus, in this second embodiment, each of the three principal walls defining the locking member 330 is abutted by an opposing principal surface defining the locking recess 430. Furthermore, the first relief wall 362 faces the first relief recess 462. It is noted, however, that in one configuration, a first gap G3 is formed between the head step wall 326 and the shank coupling portion 412 as shown in FIG. 15 and so at least portions of the head step wall 326 remain unabutted by the shank coupling portion.

In terms of functionality, the second surface 436 of each locking recess 430 serves as a torque transmission surface 436, abutting and imparting a rotational force to the second wall 336 of the locking member 430, in the direction of rotation R2. Furthermore, the first surface 434 of each locking recess 430 provides axial support in a rearward direction to a corresponding head segment, while the third surface 438 of each locking recess 430 provides axial support in the forward direction to the head segment 312. Thus, in the axial direction, the locking member 330 abuts, and is wedged between, the first surface 434 and the third surface 438 of the shank coupling portion 412. The first 334, second 336 and third 38 walls of each head segment 312, and the first 434, second 436 and third surfaces 438 of each shank coupling portion 412 may be ground to facilitate abutment.

Figure 19:
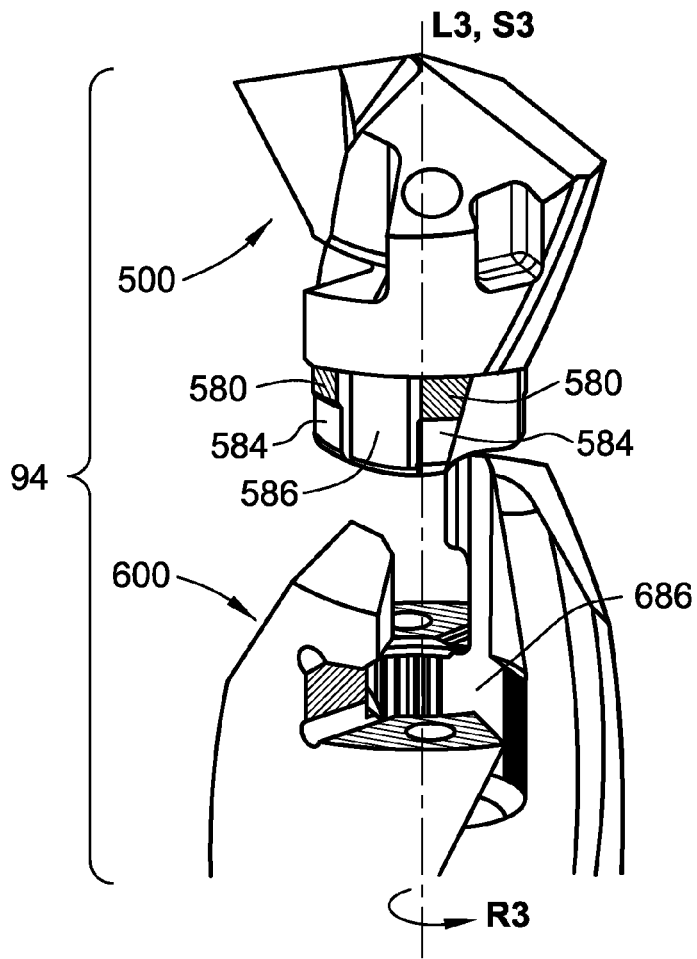
FIG. 19 shows a perspective view of a disassembled cutting tool assembly in accordance with a third embodiment of the invention.

FIG. 19 shows a rotary metal cutting tool assembly 94, in this case a drill 94, in accordance with a third embodiment of the present invention. The drill 94 includes a cutting head 500 releasably mounted on a shank 600 with the cutting head and the shank having a common longitudinal tool axis L3 around which the tool rotates in a direction of rotation R3. The cutting head 500 is preferably of the sort used in metal cutting operations and thus can be considered a metal cutting head. The cutting head 500 and tool shank 600 in drill 94 are made of the same corresponding materials discussed above with respect to drills 90 and 92.

Figure 20:
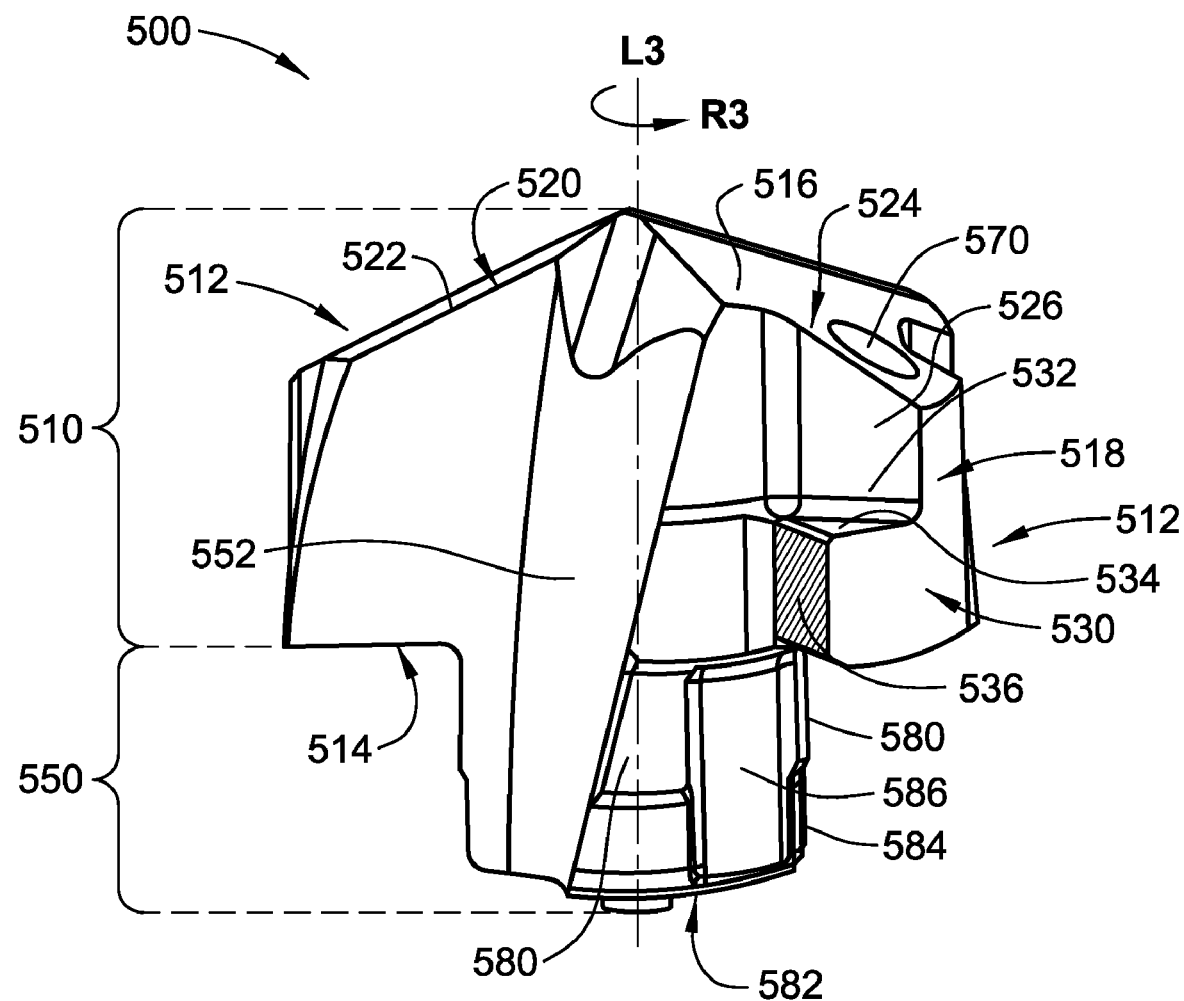
FIG. 20 shows a side view of a cutting head in accordance with a third embodiment of the invention, as seen in FIG. 19.

FIG. 20 shows a top perspective view of the cutting head 500 seen in FIG. 19. Cutting head 500 comprises a cap portion 510 and a tail portion 550 joined to the cap portion 510. The tail portion 550 extends in a rearward direction of the cutting head 500. The cap portion 510 includes a plurality of rotationally spaced-apart head segments 512. Although only two head segments 512 are shown, it is understood that other numbers of head segments may be provided instead. Each head segment 512 comprises a head base surface 514, a head top surface 516 and a head peripheral surface 518. A head flute 552 connecting the cap portion 510 to the tail portion 550 is present between adjacent head segments 512.

Each head segment 512 also includes a rotationally leading portion 520 having a cutting edge 522 that generally faces the direction of rotation R3 about the longitudinal axis L3. Each head segment 512 also includes a rotationally trailing portion 524, and comprises at least one head coolant channel 570 opening out on the head top surface 516 between the rotationally leading portion 520 and the rotationally trailing portion 524. The rotationally trailing portion 524 includes a head step wall 526 which is connected to a trailing portion of the head top surface 516. The head step wall 526 extends in a rearward direction of the cutting head 500, i.e., towards the tail portion 550.

Each head segment 512 also includes a locking member 530 which is connected to a lower portion 532 of the head step wall 526, and extends in a direction opposite to the direction of rotation R3. The locking member 530 includes a first wall 534, a second wall 536 and a third wall 538 which, in this third embodiment forms a portion of the head base surface 514. The first wall 534 is connected to the lower portion 532 of the head step wall 526 and principally extends in a direction opposite to the direction of rotation R3. The first wall 534 and the head base surface 514 both are substantially perpendicular to the longitudinal axis of rotation L3. The second wall 536 is connected to a trailing end of the first wall 534 and principally extends in a rearward direction of the cutting head 500. The third wall 538 is connected to a lower portion of the second wall 536 and principally extends in the direction of rotation R2, from the second wall 536.

In this third embodiment of the cutting head 500, the second wall 536 is configured as a circumferential abutment surface, while the third wall 338 is configured as an axial abutment surface. As such, the second 336 and third 338 walls may be ground to facilitate seating and abutment. Significantly, however, in one configuration, the first wall 534 does not play a role in axial positioning.

The tail portion 550 comprises a plurality of circumferentially spaced apart, radially outwardly protruding tail fixation surfaces 580. Each tail fixation surface 580 extends at least partially along the cutting head longitudinal axis L3. As seen in FIG. 20, each tail fixation surface 580 is formed on an upper surface of the tail portion 550, proximate the head base surface 514. In one embodiment, each tail fixation surface 580 has an arcuate shape in a cross-section taken perpendicular to the cutting head longitudinal axis L3 and thus comprises a portion of a cylindrical shell. Between each tail fixation surface 580 and a tail portion's bottom surface 582, is a recessed lower tail surface 584 whose radially outermost contour is radially inward of the tail fixation surface 580. Located between adjacent tail fixation surfaces 580 is an elongated tail fixation recess 586, whose radially outermost contour also is radially inward of the tail fixation surface 580. As such, the tail fixation surfaces 580 form the radially outermost portions of the tail portion 550.

Figure 21:
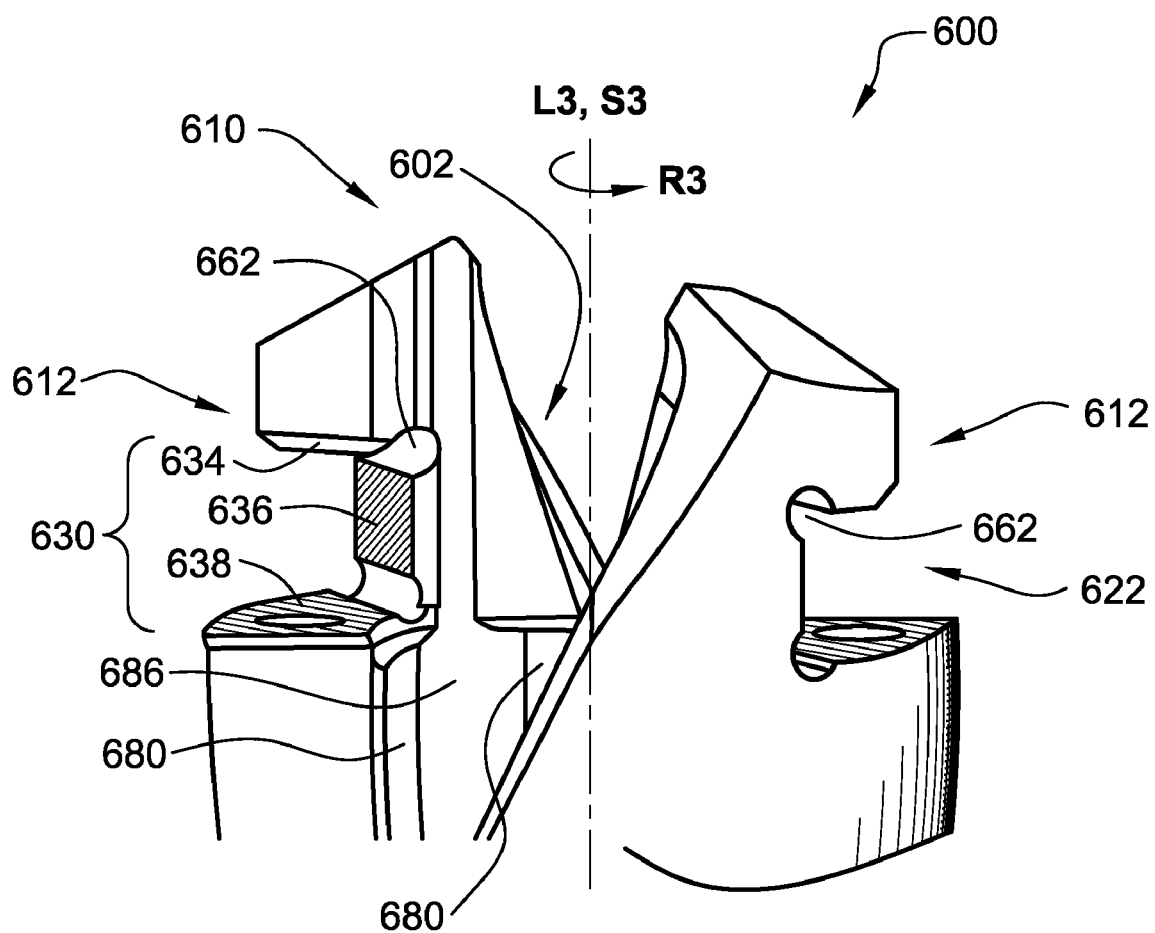
FIG. 21 shows a side view of a forward end of a tool shank in accordance with a second embodiment of the invention, as seen in FIG. 19.

FIG. 21 shows a perspective view of the tool shank 600 seen in FIG. 19. The tool shank 600 has a shank longitudinal axis S3 which is coincident with the longitudinal axis of rotation L3 of the assembled tool 94. The shank 600 has a plurality of rotationally spaced apart shank coupling portions 612 which are resiliently displaceable relative to one another. Each shank coupling portion 612 has at least one shank coolant channel 670. In the fully assembly tool, each shank coolant channel 670 communicates with the corresponding head coolant channel 570.

Figure 22:
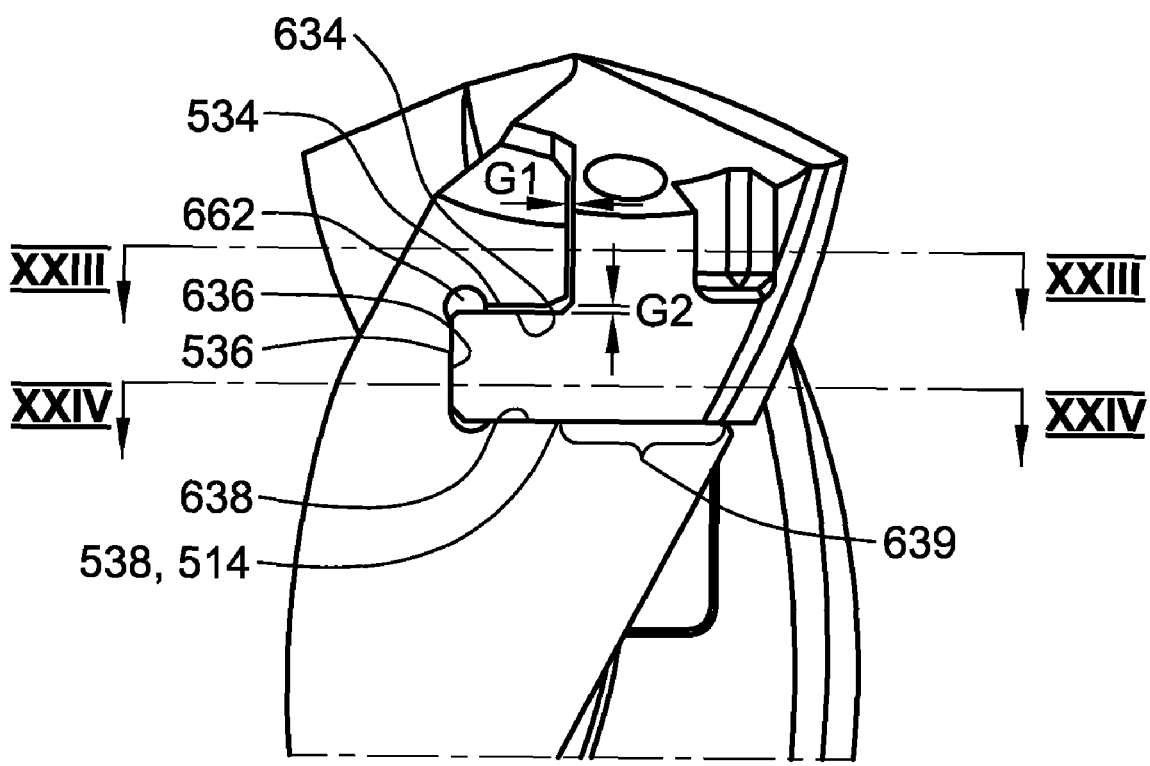
FIG. 22 shows a side view close up of the fully assembled cutting tool assembly of FIG. 19 showing the locking member mated to the locking recess.

Each shank coupling portion 612 comprises a shank locking recess 630 having a circumferentially facing opening 622. As best seen in FIGS. 21 and 22, each shank locking recess 630 comprises an upper first surface 634 extending along the direction of rotation R3, an intermediate second surface 636, and a lower third surface 638. The intermediate second surface 636 is connected to a trailing end of the upper first surface 634 optionally via a relief recess 662, faces a substantially circumferential direction and principally extends in a rearward direction of the tool shank 600. Meanwhile, the lower third surface 638 is connected to a lower portion of the intermediate second surface 636 optionally via a relief recess and circumferentially extends along the direction of rotation R3, well past the circumferential extent of the upper first surface 634 such that the lower third surface 638 has an exposed rotationally leading portion 639 (see FIG. 22).

At a forward end 610, the shank 600 is provided with a shank pocket recess 602. Within the shank pocket recess 602, the inner surface of each shank coupling portion 612 further comprises one or more shank fixation surfaces 680 separated by a longitudinally extending shank fixation recess 686. As seen in FIG. 21, two such shank fixation surfaces 680 may be associated with each shank coupling portion 612, a leading shank fixation surface 680 adjacent to the recess opening 622, and a trailing shank fixation surface 680 on the other side of the shank fixation recess 686.

Each shank fixation surface 680 extends at least part-way along the shank longitudinal axis S3. In one embodiment, each shank fixation surface 680 has an extent along the shank longitudinal axis S3 that is greater than an extent in a direction transverse to the shank longitudinal axis S3. Thus, in one embodiment, each shank fixation surface 680 forms a rectangular surface. In some embodiments, each shank fixation surface 680 may have an arcuate shape in a cross-section taken perpendicular to the shank longitudinal axis S3, and thus comprises a portion of a cylindrical shell. The shape of the shank pocket recess 602 is such that a narrow neck region is formed at the base of each shank coupling portion 612, thereby making the shank coupling portions 612 slightly resiliently displaceable relative to one another.

Figure 24:
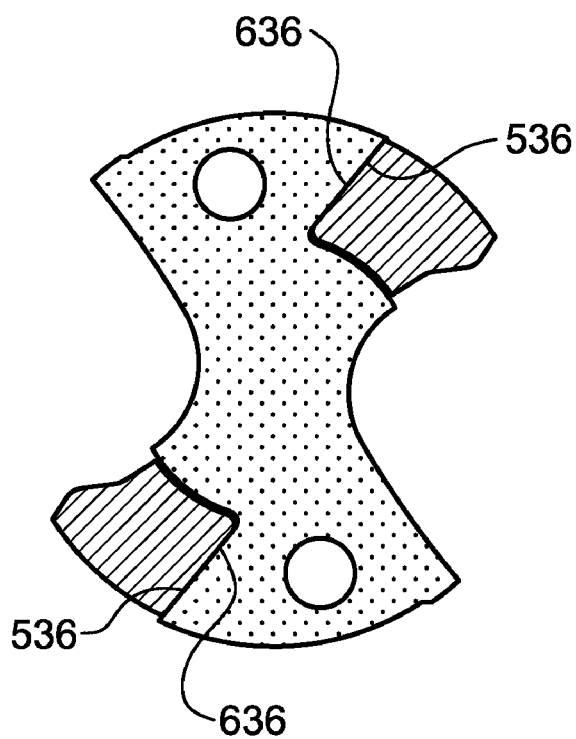
FIG. 24 shows a cross-section taken along lines XXIV-XXIV in FIG. 22.

As best seen in FIGS. 22 and 24, in the fully assembled tool 94, each locking member 530 of the cutting head 500 occupies a corresponding locking recess 630 on the tool shank 600. With respect to the locking member 530 and the locking recess, the second surface 636 of each shank coupling portion 612 abuts the second wall 536 of a corresponding head segment 512, and the third surface 538 of each shank coupling portion 612 abuts the third wall 538 of a corresponding head segment 512.

Figure 23:
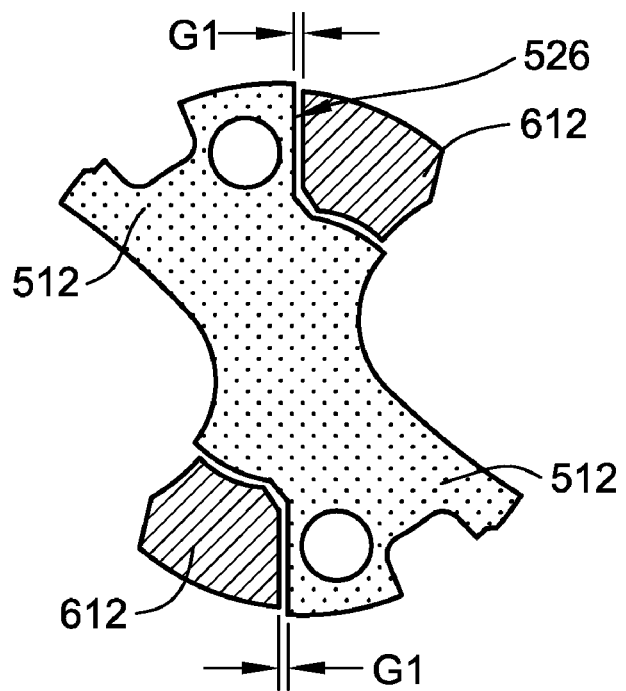
FIG. 23 shows a cross-section taken along lines XXIII-XXIII in FIG. 22.

As seen in FIGS. 22 and 23, a first gap G1 exists between head step wall 526 and the shank coupling portion 612. A second gap G2 may also be present between the locking member's first wall 534 and the upper first surface 634 of the locking recess 630. Thus, at least portions of the head step wall 526 remain unabutted by the shank coupling portion 612, as may portions of the first locking member's first wall 534.

Figure 25:
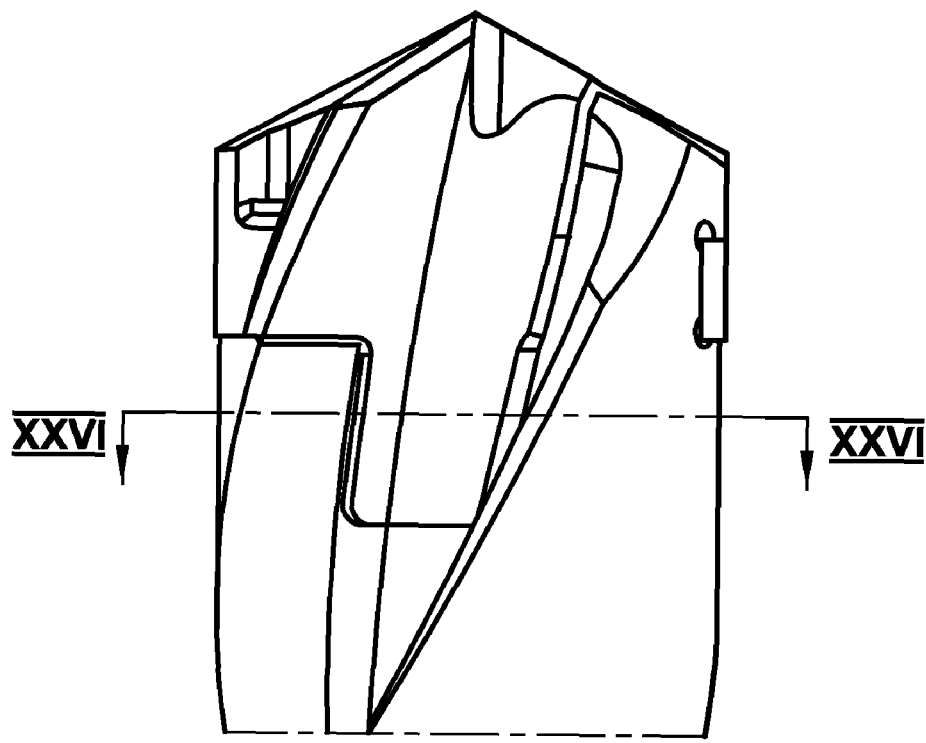
FIG. 25 shows the fully assembled cutting tool assembly of FIG. 22, slightly rotated.
Figure 26:
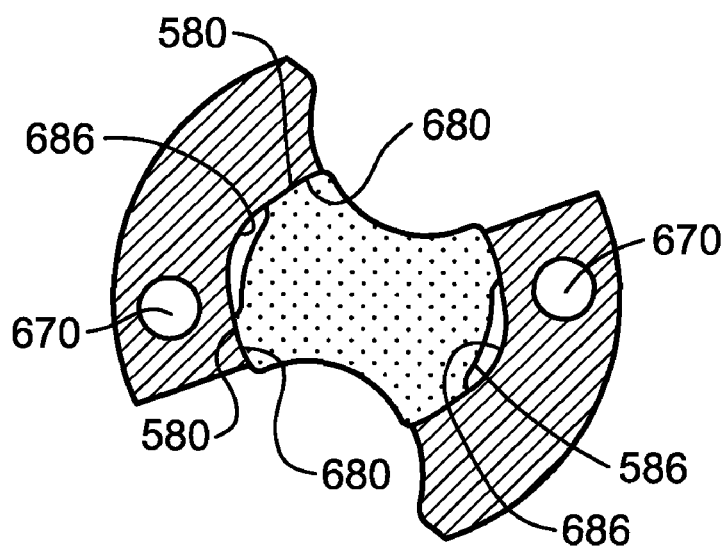
FIG. 26 shows a cross-section taken along lines XXVI-XXVI in FIG. 25.

In addition, as seen in FIGS. 25 and 26, the tail fixation surfaces 580 are in abutment with the shank fixation surfaces 680, further securing the cutting head 500 to the tool shank 600.

In terms of functionality, the second surface 636 of each locking recess 630 serves as a torque transmission surface 636, abutting and imparting a rotational force to the second wall 636 of the locking member 530, in the direction of rotation R3. Furthermore, the third surface 638 of each locking recess 630 abuts the third wall 538 and provides axial support in the forward direction to a corresponding head segment. The second 536 and third 568 walls of each locking member 530 and the second 636 and third surfaces 638 of each shank coupling portion 612 may be ground to facilitate abutment. Meanwhile the tail fixation surfaces 580 and the shank fixation surfaces 680 help center and retain the cutting head 500.

In order to mount the cutting head 500 on the tool shank 600, the cutting head 500 and tool shank 600 are first axially aligned so that the head segments 512 and shank coupling portions 612 are interleaved in the axial direction, a trailing tail fixation surface 580 aligned with the shank fixation recess 686 and the tail fixation recess 586 aligned with a leading shank fixation surface 680.

The cutting head 500 and tool shank 600 are then urged towards each other in the axial direction until the tail portion 550 enters the shank pocket recess 602 and the third wall 538 abuts the exposed rotationally leading portion 639 of third support surface 638. At this juncture, the trailing tail fixation surface 580 faces the shank fixation recess 686, the tail fixation recess 586 faces the leading shank fixation surface 680, and the locking member 530 is poised to enter the locking recess 630.

Finally, the cutting head 500 is brought into a fully mounted position by rotating it in a direction opposite to the direction of rotation R3, relative to the tool shank 600. As this is done, the locking member 530 enters the locking recess 630. The rotation is continued until the intermediate second surface 636 abuts the second wall 536, and the tail fixation surfaces 580 ride upon the shank fixation surfaces 680 within the pocket recess 602. As the tail fixation surfaces 580 ride upon the shank fixation surfaces 680 to their final position (see FIG. 25 and FIG. 26), the shank coupling portions 612 are resiliently displaced in a generally radially outward direction.

It should be noted that in each of the foregoing embodiments, in the fully assembled tool, the cutting head is retained in by the tool shank in a self-clamping manner, and so is releasably mounted therein without the use of screws. Furthermore, with each of these embodiments, the drilling rotation direction is the same as circumferential locking direction, thereby resulting in the cutting head being further secured during use.

Although the present invention has been described to a certain degree of particularity, it should be understood that various alterations and modifications could be made without departing from the scope of the invention as hereinafter claimed.

What is claimed is:

1. A cutting head having a cutting head longitudinal axis defining forward and rearward directions, the cutting head comprising:

a cap portion comprising a plurality of spaced-apart head segments, each head segment comprising:
  a head top surface;
  a head base surface;
  a rotationally leading portion connected to the head top surface, the rotationally leading portion including a cutting edge and generally facing a direction of rotation about the longitudinal axis;
  a rotationally trailing portion connected to the head top surface, the rotationally trailing portion including a head step wall which is connected to a trailing portion of said head top surface and extends in a rearward direction of the cutting head; and
  a locking member extending in a direction opposite to said direction of rotation, each locking member comprising:
    a first wall connected to a lower portion of said head step wall and principally extending in a direction opposite to said direction of rotation;
    a second wall connected to a trailing end of said first wall and principally extending in a rearward direction of the cutting head; and
    a third wall connected to a lower portion of said second wall and principally extending in said direction of rotation; and
a tail portion joined to the cap portion and extending in a rearward direction of the cutting head to a tail portion bottom surface, the tail portion comprising:
  a plurality of circumferentially spaced apart tail fixation surfaces, each tail fixation surface extending at least partially along the cutting head longitudinal axis; and
  an elongated tail fixation recess between adjacent tail fixation surfaces, the elongated tail fixation recess having a radially outermost contour which is radially inward of the tail fixation surfaces;
wherein:
the first wall is not configured as an axial abutment surface;
the second wall is configured as a circumferential abutment surface; and
the third wall is configured as an axial abutment surface.

2. A cutting head having a cutting head longitudinal axis defining forward and rearward directions, the cutting head comprising:

a cap portion comprising a plurality of spaced-apart head segments, each head segment comprising:
  a head top surface;
  a head base surface;
  a rotationally leading portion connected to the head top surface, the rotationally leading portion including a cutting edge and generally facing a direction of rotation about the longitudinal axis; and
  a rotationally trailing portion connected to the head top surface, the rotationally trailing portion including a head step wall which is connected to a trailing portion of said head top surface and extends in a rearward direction of the cutting head; and
a tail portion joined to the cap portion and extending in a rearward direction of the cutting head;
wherein:
each head segment further comprises a locking member extending in a direction opposite to said direction of rotation, each locking member comprising:
  a first wall connected to a lower portion of said head step wall and principally extending in a direction opposite to said direction of rotation;

a second wall connected to a trailing end of said first wall and principally extending in a rearward direction of the cutting head;

a third wall connected to a lower portion of said second wall and principally extending in said direction of rotation;

a fourth wall connected to a rotationally leading portion of said third wall and principally extending in a rearward direction of the cutting head; and a fifth wall connected to a lower portion of said fourth wall and principally extending in said direction of rotation.

3. The cutting head according to claim 2, wherein:
the first wall is configured as an axial abutment surface;
the fourth wall is configured as a circumferential abutment surface; and
the fifth wall is configured as an axial abutment surface.

4. The cutting head according to claim 3, wherein the fifth wall is a portion of the head base surface.

5. The cutting head according to claim 3, wherein the first wall and the fifth wall are substantially parallel to one another.

6. A rotary cutting tool comprising:
a cutting head releasably mounted on a forward end of a tool shank, the cutting head and the tool shank having a common longitudinal axis of rotation defining forward and rearward directions, and a direction of rotation around said longitudinal axis, wherein:

the cutting head comprises:
　a cap portion comprising a plurality of spaced-apart head segments, each head segment comprising:
　　a head top surface;
　　a head base surface;
　　a rotationally leading portion connected to the head top surface, the rotationally leading portion including a cutting edge and generally facing a direction of rotation about the longitudinal axis;
　　a rotationally trailing portion connected to the head top surface, the rotationally trailing portion including a head step wall which is connected to a trailing portion of said head top surface and extends in a rearward direction of the cutting head; and
　　a locking member extending in a direction opposite to said direction of rotation, each locking member comprising:
　　　a first wall connected to a lower portion of said head step wall and principally extending in a direction opposite to said direction of rotation;
　　　a second wall connected to a trailing end of said first wall and principally extending in a rearward direction of the cutting head; and
　　　a third wall connected to a lower portion of said second wall and principally extending in said direction of rotation; and
　a tail portion joined to the cap portion and extending in a rearward direction of the cutting head to a tail portion bottom surface, the tail portion comprising:
　　a plurality of circumferentially spaced apart tail fixation surfaces, each tail fixation surface extending at least partially along the cutting head longitudinal axis; and
　　an elongated tail fixation recess between adjacent tail fixation surfaces, the elongated tail fixation recess having a radially outermost contour which is radially inward of the tail fixation surfaces;

the tool shank comprises:
　a shank longitudinal axis which is coincident with the longitudinal axis of rotation;
　a shank pocket recess formed along the shank longitudinal axis, the shank pocket recess comprising a plurality of circumferentially spaced apart shank fixation surfaces; and
　a plurality of rotationally spaced apart shank coupling portions formed at the forward end of the tool shank, each shank coupling portion comprising:
　　a shank locking recess having an opening facing the direction of rotation, the shank locking recess comprising an upper first surface extending along said direction of rotation, an intermediate second surface connected to the upper first surface and principally extending in a rearward direction of the tool shank, and a lower third surface connected to the intermediate second surface and principally extending along said direction of rotation;

each locking member of the cutting head occupies a corresponding locking recess on the tool shank; and the tail portion of the cutting head occupies the shank pocket recess on the tool shank with each of said plurality of circumferentially spaced apart shank fixation surfaces abutting a plurality of spaced apart tail fixation surfaces.

7. The rotary cutting tool according to claim 6, wherein:
for each shank coupling portion, the intermediate second surface abuts the second wall of a corresponding locking member, and serves as a torque transmission surface.

8. The rotary cutting tool according to claim 7, wherein:
for each shank coupling portion, the lower third surface of the locking recess abuts the third wall of a corresponding locking member, and provides axial support thereto.

9. The rotary cutting tool according to claim 8, wherein:
for each shank coupling portion, the upper first surface of the locking recess does not abut the first wall of a corresponding locking member.

10. A rotary cutting tool comprising:
a cutting head releasably mounted on a forward end of a tool shank, the cutting head and the tool shank having a common longitudinal axis of rotation defining forward and rearward directions, and a direction of rotation around said longitudinal axis, wherein:

the cutting head comprises the cutting head of claim 2;
the tool shank comprises:
　a shank longitudinal axis which is coincident with the longitudinal axis of rotation;
　a shank pocket recess formed along the shank longitudinal axis; and
　a plurality of rotationally spaced apart shank coupling portions formed at the forward end of the tool shank, each shank coupling portion comprising:
　　a shank locking recess having an opening facing the direction of rotation, the shank locking recess comprising an upper first surface extending along said direction of rotation, an intermediate second surface connected to the upper first surface and principally extending in a rearward direction of the tool shank, a lower third surface connected to the intermediate second surface and principally extending along said direction of rotation; a fourth surface connected to the lower third surface, the fourth surface principally extending in a rearward direction of the tool shank; and a fifth surface connected to a lower portion of the fourth surface and principally extending in said direction of rotation;

each locking member of the cutting head occupies a corresponding locking recess on the tool shank;
the tail portion of the cutting head occupies the shank pocket recess on the tool shank;
the first surface of each shank coupling portion abuts the first wall of a corresponding head segment;
the fourth surface of each shank coupling portion abuts the fourth wall of a corresponding head segment; and
the fifth surface of each shank coupling portion abuts the fifth wall of a corresponding head segment.

11. The rotary cutting tool according to claim 10, wherein:
the tail portion of the cutting head is in non-retaining sliding relationship with the shank pocket recess.

12. The rotary cutting tool according to claim 10, wherein:
the first surface of each shank coupling portion provides axial support to a corresponding head segment;
the fourth surface of each shank coupling portion serves as a torque transmission surface; and
the fifth surface of each shank coupling portion provides axial support to a corresponding head segment.

13. A cutting head having a cutting head longitudinal axis defining forward and rearward directions, the cutting head comprising:
a cap portion comprising a plurality of spaced-apart head segments, each head segment comprising:
a head top surface;
a head base surface;
a rotationally leading portion connected to the head top surface, the rotationally leading portion including a cutting edge and generally facing a direction of rotation about the longitudinal axis;
a rotationally trailing portion connected to the head top surface, the rotationally trailing portion including a head step wall which is connected to a trailing portion of said head top surface and extends in a rearward direction of the cutting head; and
a locking member extending in a direction opposite to said direction of rotation, each locking member comprising:
a first wall connected to a lower portion of said head step wall and principally extending in a direction opposite to said direction of rotation;
a second wall connected to a trailing end of said first wall and principally extending in a rearward direction of the cutting head; and
a third wall connected to a lower portion of said second wall and principally extending in said direction of rotation; and
a tail portion joined to the cap portion and extending in a rearward direction of the cutting head to a tail portion bottom surface, the tail portion comprising:
a plurality of circumferentially spaced apart tail fixation surfaces, each tail fixation surface extending at least partially along the cutting head longitudinal axis; and
an elongated tail fixation recess between adjacent tail fixation surfaces, the elongated tail fixation recess having a radially outermost contour which is radially inward of the tail fixation surfaces; and
a recessed lower tail surface between each tail fixation surface and the tail portion bottom surface, a radially outermost contour of the recessed lower tail surface being radially inward of a corresponding tail fixation surface.

* * * * *